United States Patent [19]

Ellis

[11] Patent Number: 4,992,716

[45] Date of Patent: Feb. 12, 1991

[54] MOTOR CONTROL WITH DIGITAL FEEDBACK

[75] Inventor: George H. Ellis, Blacksburg, Va.

[73] Assignee: Kollmorgen Corp., Simsbury, Conn.

[21] Appl. No.: 388,683

[22] Filed: Aug. 2, 1989

[51] Int. Cl.$^5$ .............................................. G05B 1/06
[52] U.S. Cl. .................................... 318/661; 318/603;
  318/592; 318/594; 341/112; 341/113; 341/114;
  341/116
[58] Field of Search ............... 318/661, 603, 592, 594;
  341/112–114, 116

[56] References Cited

U.S. PATENT DOCUMENTS

| | | | |
|---|---|---|---|
| 3,984,831 | 10/1976 | Jones et al. | 341/116 |
| 4,014,014 | 3/1977 | Jones et al. | 341/113 |
| 4,021,714 | 5/1977 | Jones et al. | 341/114 |
| 4,315,198 | 2/1982 | Lin et al. | 318/594 |
| 4,429,267 | 1/1984 | Veale | 318/594 |
| 4,447,771 | 5/1984 | Whited . | |
| 4,599,547 | 7/1986 | Ho | 318/594 |

OTHER PUBLICATIONS

Analog Devices, "Variable Resolution, Monolithic Resolver-to-Digital Converter (2S82)", Preliminary Data Sheet dated 11/87.

Analog Devices, "Variable Resolution, Monolithic Resolver-to-Digital Converter (2S80)", Data Sheet dated 6/87.

Intel, "MCS -96,809XBH-10, Advanced 16-Bit Microcontroller with 8-OR or 16-Bit External Bus", Data Sheet dated 7/87.

Primary Examiner—William M. Shoop, Jr.
Assistant Examiner—Saul M. Bergmann
Attorney, Agent, or Firm—Morgan & Finnegan

[57] ABSTRACT

A motor feedback control system which in addition to a quantized digital position feedback value, uses a feedback signal which represents the error between the actual motor position and the quantized digital position. The error function is combined with the quantized digital position value to produce a digital position value with greater resolution. The combined value is differentiated to produce a velocity value for velocity feedback control of the motor.

7 Claims, 4 Drawing Sheets

MOTOR CONTROL WITH DIGITAL FEEDBACK

TECHNICAL FIELD

The present invention relates to a method and an apparatus for feed back control of an electric motor, and more particularly to automatic feedback control of electric motors.

BACKGROUND OF THE INVENTION

In automatic control systems, feedback signals representing measurements of parameters under control are compared against the desired values set by the operator. A difference or an error signal is derived from the comparison and the parameter is further adjusted to reduce such error. The parameter is set as desired when the error is reduced substantially to zero. For high performance control, it is essential that the parameter sensors accurately and precisely measure the parameters under control. For motor control systems, parameters such as velocity and position must be accurately and precisely measured.

In prior motor feedback control systems, devices such as resolvers and tachometers have commonly been used to measure motor position and velocity.

Motor velocity measurement by an analog tachometer suffers from the inherent problems of an analog system; i.e., problems of offset, scaling inaccuracies, and temperature drift. A digital velocity value can be obtained by using an analog to digital converter, but this method does not eliminate the inherent problems associated with analog devices. Furthermore, a sufficiently precise analog to digital converter requires a large number of bits of resolution and would become too expensive for most systems.

Motor angular positional information is often derived by means of a resolver and a resolver to digital converter. The angular position value is measured and then quantized into a digital feedback value. The precision of such digital feedback system is dependent on the resolution of the quantization boundary. The resolution of the digital data from the quantization is inversely proportional to the motor speed being quantized; that is, as the motor speed increases, the resolution or the quantization boundary in number of bits derived will necessarily decrease. For example, when a motor increases its speed from 300 rpm to 1500 rpm, a digital resolver which produces a 16 bit quantization at 300 rpm will typically have a reduction in resolution down to a quantization boundary of 14 bits.

For added precision, both the digital and analog feedback values can be combined in one system. In such a system the resolver will output both digital and analog feedback values. The digital data from the resolver represents the quantized positional value and is used in the digital feedback loop. The analog feedback output represents the error signal between the quantized positional value and the actual motor position. In such a system, the motor is adjusted in a digital feedback loop according to the digital feedback value. The system then switches over to the analog feedback loop for fine adjustment according to the analog feedback signal. The latter analog feedback loop is known to one skilled in the art as the analog lock feedback loop.

Velocity feedback data for motor speed control can be similarly obtained from positional feedback information by differentiating the feedback values from the resolver.

SUMMARY OF THE INVENTION

In accordance with the present invention, a low cost and high resolution digital data feedback of motor position is derived by digitizing an analog position error signal and cascading such digitized data to quantized position data. The analog position error signal is a measurement from a resolver which represents the difference between the quantized feedback value and the actual motor position value. This signal is commonly used as the analog position feedback signal for the analog lock feedback loop for motor control. The combined digital data formed from the cascade eliminates the need for a motor feedback control system which switches between a coarse digital loop and a fine analog feedback loop, thus avoiding problems from offset, temperature drift, and scaling inaccuracies commonly found in analog feedback systems. The combined digital data provides the added advantage of having a higher resolution or more precise digital feedback data without the use of a higher resolution and thus more costly analog to digital converter.

Similarly, a low cost and high resolution digital velocity feedback data is derived by differentiating the combined digital position feedback data.

DETAILED DESCRIPTION OF THE DRAWINGS

In motor control systems there is an analog signal which represents the error between the measures and the quantized digital position values and the actual positions of the motor. That analog signal is usually used in motor controllers as an analog feedback value for an analog feedback loop.

In accordance with the invention in a preferred embodiment, an improved digital feedback value can be obtained using this analog signal. For purposes of indentification, the signal will be called ILSB since it is indicative of an analog signal comparable in magnitude to the last two bits or second least significant digital bit of the quantized digital position value.

The ILSB varies proportionally to the offset of the motor from the zero crossing or the quantized position and can be defined by the formula in Equation 1.

$$ILSB = KSCALE * (POS - DPOS) \qquad \text{Eq. 1.}$$

Where ILSB is the error value; POS is the actual position of the motor; DPOS is the quantized value of the motor position; KSCALE is a constant scaling factor of the resolver to digital converter.

The actual position of the motor can be represented by the expression in Equation 2.

$$POS = DPOS + ILSB/KSCALE \qquad \text{Eq. 2.}$$

Figure 1:
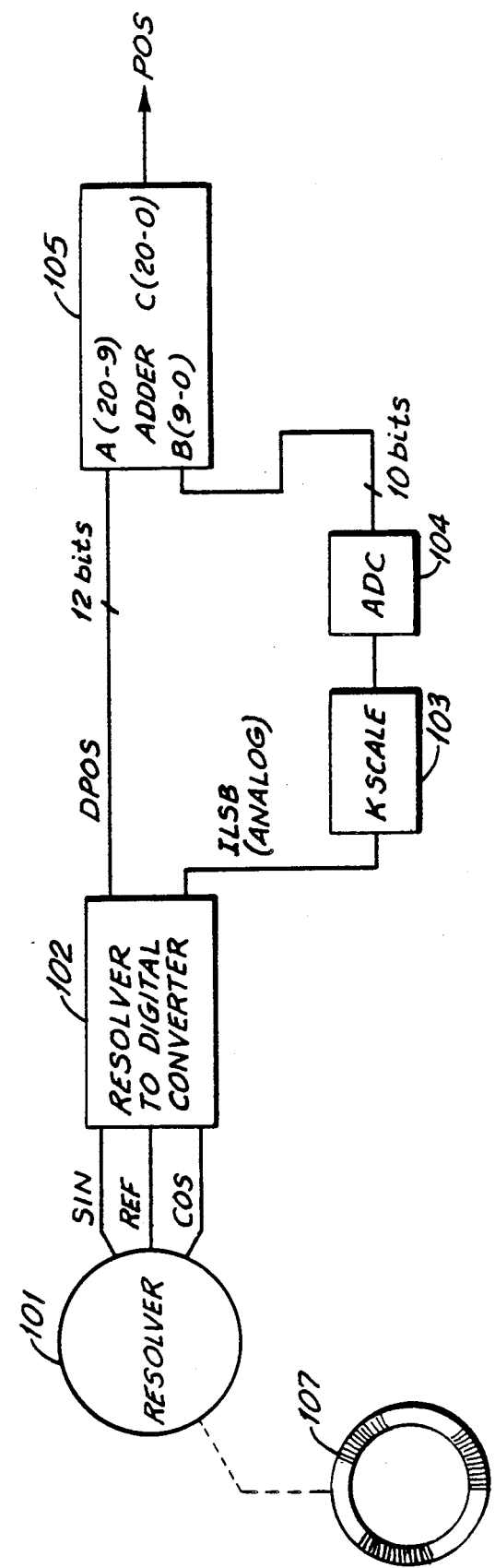
FIG. 1 is a block diagram of the digital position data feedback unit according to the present invention.

Further, actual velocity data is obtained by differentiating the actual position value POS or the sum of DPOS and ILSB/KSCALE. The principles of the invention are applied in the position data feedback unit as shown in FIG. 1 which is an implementation of the Equation 2. Referring to FIG. 1, resolver 101 is used to measure the angle position of the motor 107. The resolver is of a conventional design including a rotor winding and two stator windings in quadrature. The rotor winding is energized by a suitable alternating signal sinW which may, for example, be 2500 Hz. If Q represents the angle between the rotor and the stator of the resolver then the quadrature windings will produce the signals sinQsinW and cosQsinW.

The resolver energizing signal and the signals produced by the quadrature windings are supplied to a resolver to digital converter 102 which interprets the received signals and provides a corresponding binary indication of the resolver shaft position DPOS and a corresponding analog voltage ILSB. As previously stated, the ILSB signal represents the error signal between the actual motor position and the quantized outputs DPOS. The magnitude of the error signal ILSB is within the second least significant bit of the digitized output DPOS. A resolver to digital converter which provides both output signals as described is commercially available and may be of a type such as the 2S82 converter sold by Analog Devices.

The digital positional signal DPOS from the converter 102 is introduced into one of the two inputs of adder 105 labelled port A. In this embodiment the DPOS signal is a 12 bit digital data. The analog signal, ILSB, represents the fine measurement value of the resolver shaft position. It has a magnitude no greater than the last two bits or second least significant bit of the digital signal DPOS. The ILSB signal is adjusted by KSCALE 103 to conform to the scale specific to the system of a particular embodiment to allow for parameter tolerances. Such adjustment may be made by means of a trimpot. The adjusted analog output from KSCALE 103 is then converted into digital representation by an anolog to digital converter 104.

According to the present embodiment, the analog signal is converted to a 10 bit digital data and is added to the 12 bit DPOS data. As shown in FIG. 1, the 10 bit converted ILSB digital data is input into the ten least significant bits (0–9) of the "B" port of adder 105, and the DPOS data is input to the 10th to 21st (9–20) bits of the "A" port of adder 105. The adder inputs are so arranged such that the most significant bit of the converted ILSB value is added to the least significant bit of the DPOS data. The output of the ladder labelled "C" is the sum of the "A" and "B" values is the sum of DPOS and ILSB/KSCALE as specified in Equation 2. The sum is the motor position value POS.

Figure 2:
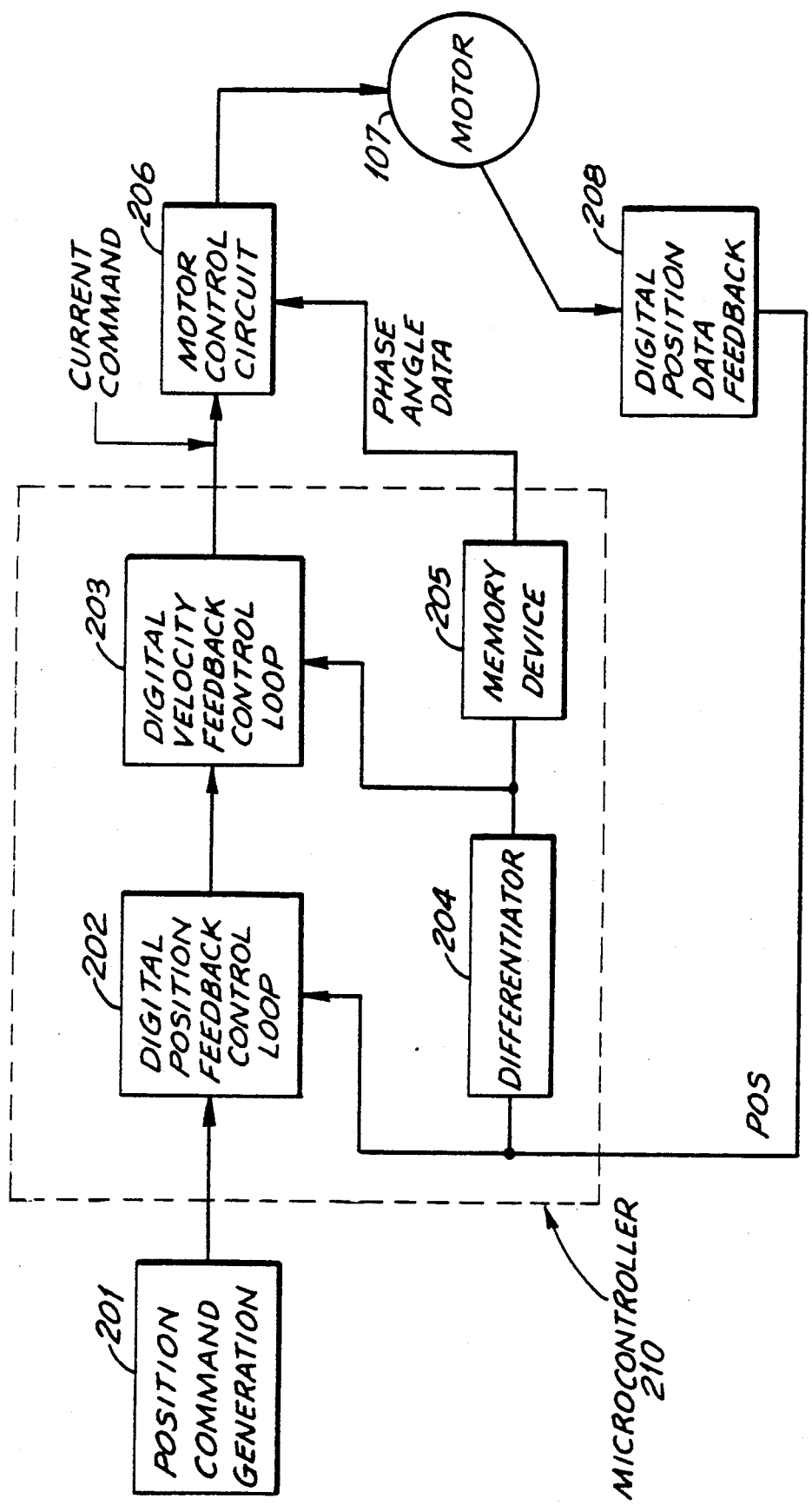
FIG. 2 is a system block diagram for a motor control system according to the present invention.

The digital position data signal POS may be incorporated in a motor control system as illustrated in the block diagram of FIG.2. Referring to FIG. 2, a microcontroller 210 is used to control the motor control circuit 206, which produces motor drive current to motor 107. The motor 107 includes 3 strator windings and are interconnected in a wye configuration.

The digital position data feedback 208 provides the function of measuring the motor position as described in connection with FIG. 1. The motor rotation or position is detected and converted into a combined digital feedback data according to the Equation 2 formula POS=-DPOS+ILSB/KSCALE. A signal of POS digital data is output the from the digital position data feedback unit 208 to the micro-controller 210. General purpose type microcontrollers such as the MCS-96 commercially sold by the Intel Corporation is an example. The microcontroller 210 contains stored programs which provide such functions as that of the position command generator 201, the digital position feedback control loop 202, the digital velocity feedback control loop 203, the differentiator 204, and the memory 205.

In the system of FIG. 2, position command is information set into the Controller. The position command is in the form of digital data representing desired motor position information. The position command generator 201 is the user to microcontroller interface for data entry or selection by a user. It may be in the form of a keyboard or any equivalent data entry device. It outputs a digital position feedback control command to position loop 202. The digital position feedback control loop 202 receives the position command and the digital position feedback control feedback data POS from the position data feedback 208 and produces a velocity command. The digital position loop 202 is further detailed in FIG. 4. The velocity command output from the position loop 202 is in the from of digital data representing the desired motor velocity.

The digital velocity feedback control loop 203 receives the velocity command input and the velocity feedback input from differentiator 204 and outputs a current command to motor control circuit 206. The current command is a digital data representing the amount of adjustment in motor speed needed to be translated by the motor control circuit 206. The velocity loop 203 is further detailed in FIG. 5.

Figure 5:
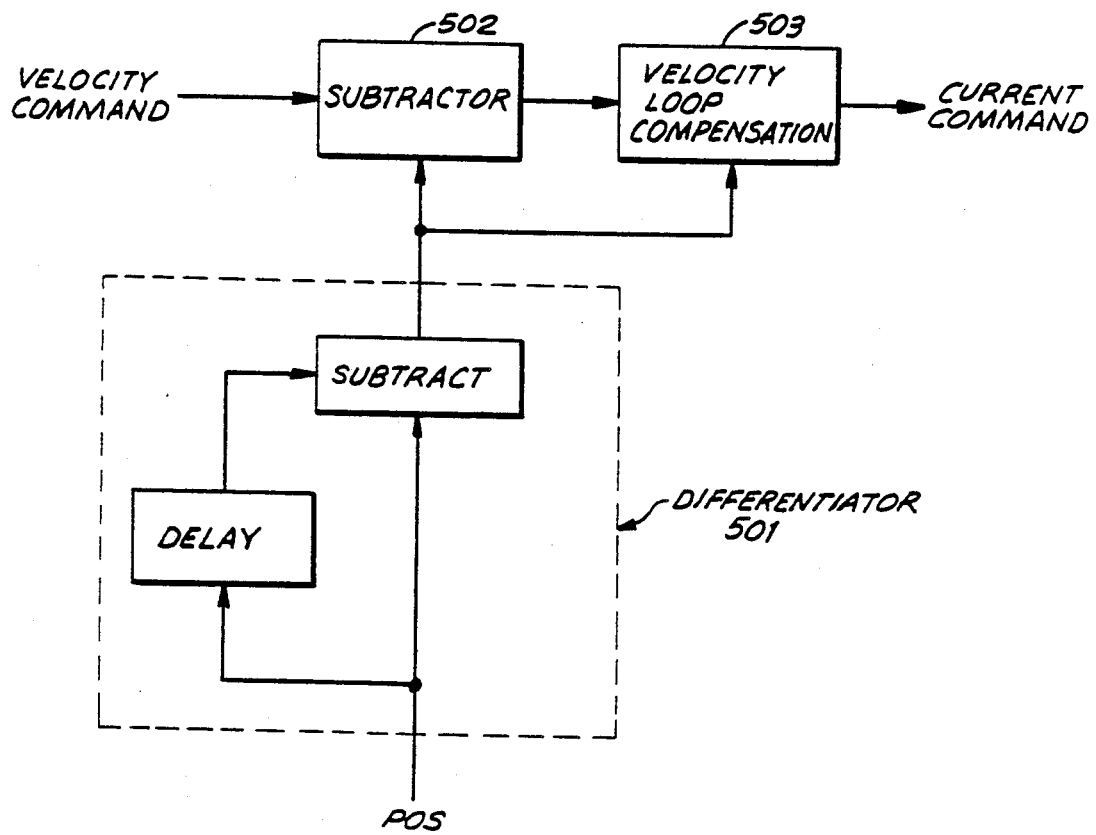
FIG. 5 is a block diagram of the digital velocity feedback control loop.

The differentiator 204 takes as input the position feedback digital data POS from position data feedback 208 and outputs a velocity feedback data to velocity loop 203 and the memory device 205. A differentiator such as the backward difference type as shown in FIG. 5 is used for this embodiment. The velocity feedback data output of the differentiator 204 is a digital data representing the motor velocity. This data is compared to the data output from the postion loop 202 to generate a current command as the output of the velocity loop 203. This data is multiplied by digital sine wave values stored in memory device 205, which is programmed to receive position feedback data as memory address and to produce corresponding digital sine wave values. The memory may be a ROM or a PROM which is programmed so that in response to any particular vector indication they produce three phase angular data. The phase angle data are sine wave values displaced from one another by a specified electrical angle, generally 120° for a 3-phase motor. The phase angle data output from the memory device 205 to the motor control circuit 206 are time division multiplexed. This is commonly referred to as commutation.

The motor control circuit 206 receives input from the microcontroller 210 in the form of current command from the digital velocity feedback control loop 203 and phase angles from the memory device 205. The motor control circuit 206 processes these input information into motor drive currents output to the motor 107. The motor control circuit 206 is further detailed in FIG. 3.

Control systems which transform synthesized digital data into sinusoidal excitation current suitable for motor control are known in the field, an example of such a system is shown in U.S. Pat. No. 4,447,771.

Figure 3:
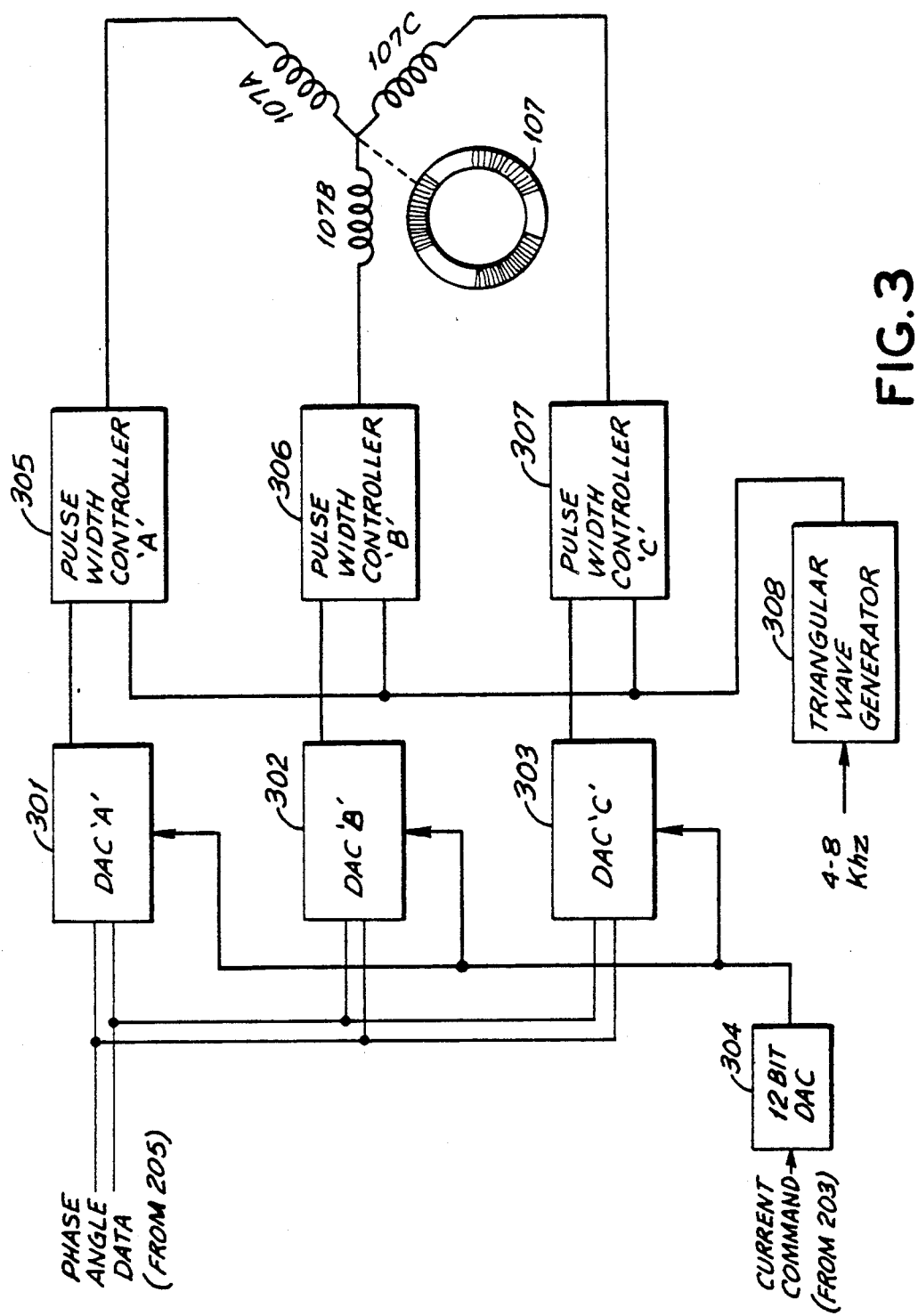
FIG. 3 is a block diagram of the motor control unit.

The motor control unit in FIG. 3 provides the excitation currents for windings 107A, 107B and 107C of motor 107 which are sinusoidal and displaced from one another by 120 electrical degrees.

The digital output indications from the memory device 205 are supplied in a time division multiplex manner to digital to analog converters DAC's 301, 302 and 303 which convert the digital sine wave values into analog values, i.e., synthesized sine waves. DAC's 301, 302 and 303 are of the analog multiplying type capable of multiplying the digital conversion result with another analog signal. The digital current command from the digital velocity feedback control loop 203 in FIG. 2 is converted to an analog current command by the 12 bit digital to analog converter 304. The analog current command output from the 12 bit DAC 304 is supplied to each of the DAC's 301, 302 and 303 and controls the amplitude of the sine wave signals produced thereby.

Thus, the outputs of DAC's 301, 302 and 303 are three synthesized sine wave voltage signals displaced from one another by 120 electrical degrees.

The sinusoidal voltage signal appearing at the output of DAC A 301 is supplied to a pilse width controller A 305 which produces pulse width voltage excitation to winding 107A of the motor. The pulse width controllers 305, 306 and 307 each receives triangular wave signals originating from a triangular wave generator 308. The amplitude of excitation voltage supplied to the winding is a variation of the triangular wave signal controlled by the current command from the output of the digital velocity feedback control loop 203 of FIG. 2. The circuitry for the current drive and control within the pulse width controllers or modulators is known in the art. An example of such circuitry can be found in U.S. Pat. No. 4,447,771.

Figure 4:
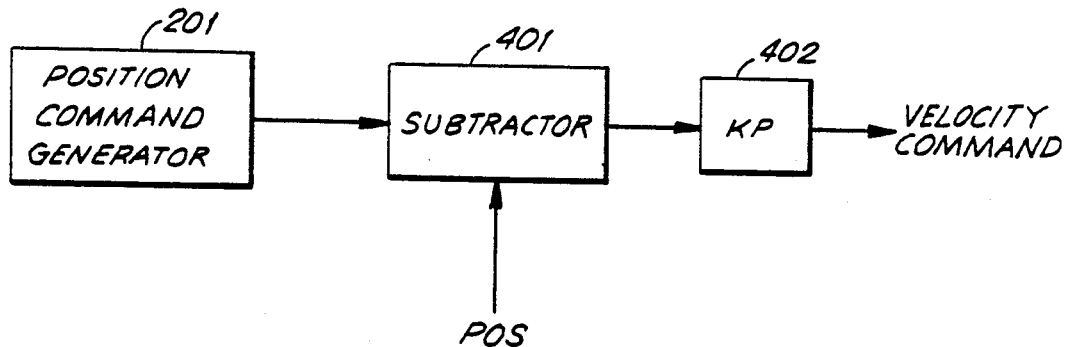
FIG. 4 is a block diagram of the digital position feedback control loop.

FIG. 4 shows a detailed version of the digital position feedback control loop shown in 202 of FIG. 2. In FIG. 4, a subtractor 401 is used to derive an error value by differencing the POS feedback value from the digital position data feedback 208 and the desired position command value as set by the position command generator 201. The digital error value output from subtractor 401 is adjusted by KP 402 so that the loop gain conforms to other system parameters. KP is typically a multiplier between zero and one-half. The output of KP 402 is the position error or velocity command input to the digital velocity feedback control loop 203.

A more detailed version of the digital velocity feedback control loop 203 of FIG. 2 is shown in FIG. 5. The POS input from the digital position data feedback 208 is differentiated by the differentiator 501. The differentiator converts the position feedback data into a velocity feedback data. A delay and subtract differentiator delays a signal and then subtracts the delayed signal from the non-delayed signal, the difference is a differentiated version of the non-delayed signal. This form of differentiation is one example of a differentiator. The velocity feedback output from the differentiator is subtracted from the velocity command in subtractor 502 to yield a velocity error value. Both the velocity error value and the velocity feedback value are fed into the velocity loop compensation 503. The velocity loop compensation is used to stabilize the various parameters and constants in the velocity loop. Examples of the types of loop compensation known to one skilled in the art are the Proportional-Integral-Differentiator (PID) and the Lead-lag types. The output of the velocity loop compensator 503 is the current command to the motor control circuit 106 which causes adjustments to the motor speed and position.

As stated in the foregoing, the system and method for motor control with digital data feedback according to the present invention will provide for improved motor control while reducing component costs. The process of digitizing a fine analog position error signal and cascading such digitized data to the coarse quantized position data provides a higher resolution digital feedback data while components such as the analog lock feedback loop and the high resolution analog to digital converter are eliminated.

I claim:

1. A digital feedback motor control system, comprising:

microcontroller means for generating a digital command representing at least one motor parameter value; resolver means having a resolver to digital converter for providing a quantized digital value representing coarse motor position and a linear analog signal representing the difference between said coarse motor position and actual motor position; means for scaling and converting said linear analog signal into a fine digital value representing fine motor position.

means for providing a digital feedback data representing the combination of said quantized digital value and said fine digital value;

means for differencing said digital command with said digital feedback data; and means for converting data from said differencing means into excitation current for driving said motor.

2. The system according to claim 1, including memory means for storing phase angle data of said motor.

3. The system according to claim 1, in which the magnitude of said fine digital value is less than the magnitude of the second least significant bit of said quantized digital value.

4. The system according to claim 1, in which said digital feedback data is differentiated to provide velocity feedback data for controlling motor velocity.

5. A system for deriving parameter feedback data for electric motor control, comprising:

a microcontroller for entering a digital command representing at least one motor parameter value;

a resolver to measure motor position;

a converter to convert said motor position to a coarse quantized data representing coarse motor position and a fine analog signal representing the linear difference between said coarse and actual motor position;

an analog-to-digital converter to convert said fine analog signal to a fine digital data;

an adder to combine said fine digital data with said coarse quantized data;

whereby said combined data is used as feedback data to adjust said motor parameter.

6. A system according to claim 5, in which the magnitude of said fine digitized data is less than the magnitude of the second least significant bit if said coarse digital data.

7. A system according to claim 5, in which said digital feedback data is differentiated to derive a digital velocity feedback data for feedback control of the velocity of said motor.

* * * * *